March 18, 1958   J. G. AFFLECK   2,827,396
WATER-PROOFING OF CONCRETE OR MASONRY SURFACES
Filed Aug. 23, 1954

FIG. 1

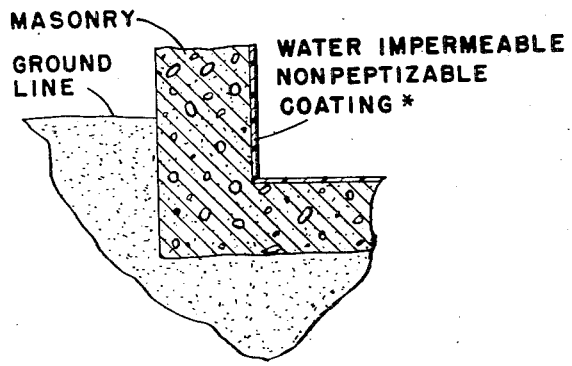

FIG. 2
CINDER BLOCK

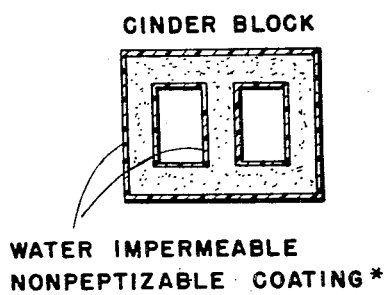

WATER IMPERMEABLE
NONPEPTIZABLE COATING*

FIG. 3
CINDER BLOCKS WALL IN SECTION

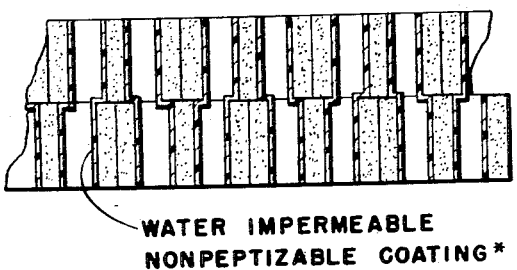

WATER IMPERMEABLE
NONPEPTIZABLE COATING*

FIG. 4
CONCRETE TANK

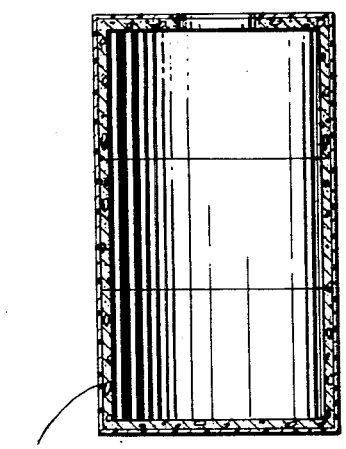

WATER IMPERMEABLE NONPEPTIZABLE COATING*

FIG. 5
BRICK

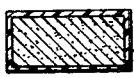

FIG. 6

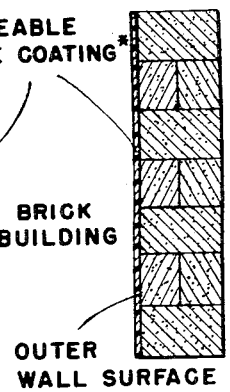

WATER IMPERMEABLE
NONPEPTIZABLE COATING*

BRICK BUILDING

OUTER WALL SURFACE

*COPOLYMER SOLUTION
OF MONOFUNCTIONAL
AND POLYFUNCTIONAL
MONOMERS GELLED
IN SITU

INVENTOR.
JAMES G. AFFLECK
BY
James F. Snowden
ATTORNEY

United States Patent Office 2,827,396
Patented Mar. 18, 1958

2,827,396

WATER-PROOFING OF CONCRETE OR MASONRY SURFACES

James G. Affleck, Darien, Conn., assignor to American Cyanamid Company, New York, N. Y., a corporation of Maine Application August 23, 1954, Serial No. 451,679

5 Claims. (Cl. 117—123)

The present invention relates to water-proofing porous masonry and the resulting water-impermeable structure.

Many proposals have been made for the water-proofing of concrete and other preformed masonry structures. For the most part these treatments have been comparatively ineffective and have often required the excavation at relatively high cost of large amounts of soil on the exterior of sub-soil masonry walls in order to permit the application of heavy coatings of bituminous or other water-proofing materials. Further, no composition has yet been prepared for application to the interior side of sub-soil masonry walls which reduces or eliminates the penetration of moisture to a satisfactory degree.

An object of the invention is to provide an improved preformed masonry structure.

Another object of the invention is to provide a method for rendering porous masonry substantially impermeable to liquids.

A further object of the invention is to provide an improved masonry structure which is substantially impervious to the penetration of liquid.

Still another object of the invention is to provide an economical method for water-proofing sub-soil masonry walls from the interior of the masonry structure.

Other objects and benefits of the invention will be apparent to those skilled in the art from the detailed description herein below.

The above and other objects of the invention may be accomplished by the treatment of preformed, rigid, porous masonry structures, including concrete, either laid in situ or preformed, brick, stone, clay tile, cinder blocks, mortar, and other masonry joint materials, with a solution of a polymer of certain acrylic compounds and gelling the polymer in situ to form a water-impermeable nonpeptizable gel, to seal the masonry against substantial penetration by moisture. The invention accordingly comprises the process and the resulting treated masonry structure.

The agents suitable for this treatment are solutions of polymers of compounds having the formula:

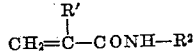

wherein R' is a hydrogen or methyl group and R² is a hydrogen or methylol radical. The polymer is gelled according to the procedure described below in situ in the pores of the masonry to a water-impermeable gel which prevents any substantial penetration of moisture through the treated pores. While the gels are compatible with water and quickly swell from the dried state to the original distended state in the presence of moisture, nevertheless these gels are nonpeptizable. They are derived from polymers having recurring units of the formula:

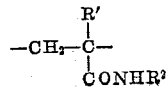

wherein R' is a hydrogen or methyl group, R² is a hydrogen or methylol radical and at least 5% of the R² groups are methylol radicals. Accordingly, these gels may be said to be made from methylolated or partially methylolated polyacrylamide or polymethacrylamide with the methylol groups attached to the nitrogen atoms, probably by the cross-linking of linear polymer chains through at least some of the methylol groups. For optimum results it is recommended that methylol groups be present on at least about 25% of the nitrogen atoms in the polymer.

The expression "polymethylolacrylamide" is used herein to denote acrylamides which are methylolated either before polymerization or after polymerization, including instances in which polyacrylamide is methylolated in situ in the pores of the masonry; and the term is also intended to include degrees of methylolation ranging from about 5% up to the maximum obtainable, which is usually of the order of 90% or 90 combined CH₂OH groups per 100 nitrogen atoms. The expression "polymethylolmethacrylamide" likewise is used in a similar sense herein in respect to the methacrylic derivatives.

The production of the methylolated and unmethylolated polymers with which this invention is concerned is well known to those skilled in the art and hence need not be set forth in detail here. The molecular weight of the polymers appears to be of little moment, except for its effect on viscosity, provided that it amounts to an average of about 1,000 or more. Those with the average molecular weights of the order of 20,000 to 500,000 have given excellent results, and it is contemplated that the average molecular weight of the polymers may range up to 10 million or higher without loss of effect.

The molecular weight of the polymer and its concentration in solution should be selected to provide a solution having a viscosity low enough to permit penetrating into masonry pores to the desired depth. For masonry in general, the viscosity should apparently be lower than about 100,000 centipoises at 20° C. and desirably between about 100 and about 15,000 centipoises at 20° C. for most purposes.

The gelling of the polymer may be accomplished by either or both of two methods. In the preferred process it is accomplished by impregnating the masonry with an aqueous solution of between 1 and 20% by weight of polymethylolacrylamide of polymethylolmethacrylamide and concentrating a solution by drying to a polymer concentration of at least 25%. When such a polymer is concentrated it will gel without the use of any initiator or catalyst and the time required for gel formation varies with a number of factors, including concentration of the solution, and the pH temperature of the solution. From this, it is obvious methylolated varieties must be stored, sold and kept until the time of application in the form of solutions of a concentration of about 20% or less in order to avoid the gelling which will render them useless. At 70° F. a neutral solution of 50% concentration by weight will gel within a few minutes, while a 30% solution requires about a day to gel. For most purposes atmospheric temperatures will concentrate the solution sufficiently by drying to form the gel within a satisfactory length of time, but artificial heat may be employed where necessary or desirable as, for instance, in the case of masonry which is constantly moist from the seepage of water. In addition to the central heating systems available in most buildings it is also contemplated that other heating means such as infra-red lamps, electric radiant heaters, fan-equipped unit heaters and even wood fires may be employed for the purpose.

In another variation of the instant process, masonry may be impregnated with a solution of polyacrylamide or polymethacrylamide and the polymer methylolated in situ by a subsequent application of an aqueous formaldehyde solution to the same masonry surfaces. The methylolated polymer produced in this manner may then be gelled by drying as described herein above. However, this two-stage method provides another way of gelling the polymer in the masonry pores by impregnating with a solution of polyacrylamide or polymethacrylamide of greater than 20% concentration, which solution does not get upon drying, and then impregnating the treated masonry with a strong formaldehyde solution to gel the polymer in the pores, since the methylolated polymer will gel within a comparatively short period at concentrations of the order indicated. The formaldehyde after-treatment may be applied also to surfaces impregnated with a partially methylolated polymer of the type described herein in order to increase the degree of methylolation of that polymer.

To expedite the gelling of polymers of the type described herein it is desirable to employ solutions of either moderately alkaline or moderately acid characteristics, for example, with pH's below about 4 or above about 10. Inasmuch as many types of masonry are either pronouncedly alkaline in character or contain acid-absorbing or acid-reacting materials it is usually preferable to use alkaline media. For this purpose any water-soluble alkali may be used, including organic bases, such as guanidine carbonate or amines, as exemplified by tetraethylene pentamine and triethanolamine; but in general ammonia or a hydroxide or water-soluble carbonate of sodium, potassium or calcium is preferred due to the lower cost. It is to be emphasized, however, that neutral solutions of the polymers may be employed where desired and that certain types of masonry, for example, concrete and the usual building mortar, are sufficiently alkaline to permit gel formation without an addition to the treating solution.

While the solutions described herein will penetrate into the pores of masonry to a sufficient depth for most purposes, it is also contemplated that any compatible wetting agents such as the di-2-ethylhexyl ester of sodium sulfosuccinate, sulfated fatty alcohols, as exemplified by sodium lauryl sulfate, and alkali metal soaps of fatty acids (i. e. sodium and potassium oleates, laurates, palmitates, stearates, etc.) may be added in conventional amounts ranging from about 0.01 to about 5% by weight of the solution to enhance the penetrating qualities of the solution where relatively deep impregnation is desired.

It should be understood that the present treatment does not amount to a mere coating of the surface of masonry, as the gels described herein readily wear or rub off of such surfaces and cannot provide the effect which is desired. The solution must penetrate into the pores of the masonry, and also into any small cracks or crevices through which water might seep and then set up to a gel in the impregnated pores and crevices.

The solutions described herein may be applied in any suitable manner, as for example, by spraying, brushing, wiping or flooding the solution onto the masonry to be treated. In addition, it appears to be immaterial whether the impregnant is applied to the exterior or interior walls of the performed masonry structure, as the treatment operates by forming a seal inside the pores which is compatible with water but impermeable to it. Water seepage through the masonry is checked either by the swollen gel or by the reactivation of a gel which has dried in the pores. This rewetting effect is comparatively rapid so the seepage swells the dried gel back to its original distended state and hence dams the pores before any appreciable amount of water passes through the pores.

Interior application of the treatment is a major advantage of the present process, since it is usually far easier to apply the impregnant in this manner in finished basements or cellars than it is to excavate around the exterior walls in order to impregnate that side of the walls.

The process of the present invention is not limited to the treatments of cellars and other underground masonry, as it is equally effective in preventing wind-driven water from soaking through walls of cinder block or concrete and for eliminating the seepage of water and other liquids from concrete tanks.

In carrying out the novel process it appears that the optimum concentration for a methylolated polymer solution is about 8 to 12% and about 20 to 30% in the case of unmethylolated polymers.

The quantity of agent employed will of course vary with the porosity of the masonry undergoing treatment and the desired depth of impregnation. In general, it is desired to impregnate masonry to a depth of at least about 1/8 inch and the maximum depth of the impregnation appears to be limited only by economic considerations and the viscosity of the polymer solution. The total quantity of agents applied may vary from about 0.005 up to about 0.5 pound on a dry basis per square foot of masonry being treated and even up to three or more pounds per square foot for special purposes in which the added cost is justified.

The treated structures appear to be capable of withstanding comparatively high water pressures, inasmuch as the gel shows no tendency to peel off or otherwise be displaced from the interior of pores of the size encountered in various types of masonry. Large crevices in the masonry should be filled with mortar in the usual fashion of making such repairs, but the novel process provides an adequate seal for smaller cracks.

For a better understanding of the nature of this invention reference should be had to the following examples which are intended to illustrate the invention and in which all proportions are given in terms of weight unless otherwise specified.

*Example I*

A 10% aqueous solution of polymethylolacrylamide which is 80% methylolated, that is, it contains 0.8 mol of combined formaldehyde per mol of acrylamide on a monomeric basis, is adjusted to a pH of 10 by stirring in 50% aqueous sodium hydroxide solution. This particular polymer is made by methylolating monomeric acrylamide with formaldehyde and thereafter polymerizing the N-methylolacrylamide.

A common unglazed building brick is sprayed on all surfaces with the polymer solution and then allowed to dry in the air for a week at 70° F. The treated brick, along with a similar untreated brick, is first weighed and then immersed in a vessel containing water at 70° F. for a period of one hour. Next, both bricks are removed from the water, rubbed dry with cloths to remove surface moisture, and then re-weighed. The weight of the untreated brick is found to be substantially greater, due to the absorption of water into its interior, whereas the treated brick displays only a negligible increase in weight as a result of immersion.

A hollow column is erected on a concrete slab to a height of approximately 50 inches by laying six hollow commercial 8" x 8" x 16" cinder blocks equipped with single center webs upon one another. A conventional building mortar is used to seal the joints between the blocks, and the mortar is allowed to cure thoroughly for 30 days. This structure contains two vertical wells, and the polymethylolacrylamide solution described above is poured into one of these, and then syphoned off in such a manner that the treating agent is in contact with the masonry for an average of about 30 minutes. The bottom of the treated well is dried with wadding attached to a handle of sufficient length, and allowed to remain empty for a week at 70° F. in order to gel the impregnant. Then both wells are filled to a depth of 4 feet with water at room temperature. After 24 hours it is observed that the surface of the column surrounding the untreated well is wet with moisture exuding through the cinder blocks and mortar joints, but all areas of the cinder blocks surrounding the treated well are found to be dry.

*Example II*

Example I is repeated, using a 20% by weight solution of polymethylolacrylamide produced by methylolating polyacrylamide to the extent of 10%. New masonry specimens are employed, and the same results are obtained as before.

*Example III*

A 5% by weight solution of polymethylolacrylamide (50% methylolated) is applied to the unglazed brick and another portion of this solution is poured into the cinder block well in accordance with the procedure of Example I and the treated materials tested in the same fashion. It is again apparent that a very high degree of water-proofing is obtained with both materials.

*Example IV*

Another brick and another cinder block well constructed as described in Example I are treated first with a 30% aqueous solution of polyacrylamide having a pH of about 11. Then the impregnated brick is after-treated three times by spraying a formalin (37% aqueous formaldehyde) solution on all six surfaces of the brick.

The impregnated cinder block well is also after-treated with the same formalin, which is allowed to remain in contact with the impregnated surfaces for an average of about 60 minutes. After allowing the brick and the cinder block column to stand overnight at 70° F. the water immersion and water seepage tests of Example I are repeated, with substantially the same results.

The embodiments of this invention described ante in this specification are further illustrated in Figures 1 to 6 of the drawings.

In the drawings:

Fig. 1 is a cross-sectional portion of a pre-formed masonry basement foundation with the polymer gel coating of the invention applied to the interior wall and floor.

Fig. 2 and Fig. 5 show a cinder block and building brick, respectively, in cross-section with the coating applied to the surfaces.

Fig. 3 shows the coating applied to the inner well surfaces of a pre-formed cinder block wall.

Fig. 4 shows a concrete tank which has been coated at the outer surface with the polymer gel.

Fig. 6 shows a brick wall in cross-section with the outer surface coated with the polymer gel of the invention.

While there are above disclosed only a limited number of the embodiments of the procedure and treated articles of the invention, it is possible to produce still other embodiments without departing from the inventive concept herein disclosed, and it is desired, therefore, that only such limitations be imposed on the appended claims as are stated therein or required by the prior art.

I claim:

1. A process which comprises impregnating the pores adjacent the surface of a preformed rigid porous masonry structure with an aqueous solution having a viscosity between about 100 and about 15,000 centipoises at 20 degrees centigrade and containing between about 1 and about 20 percent by weight of a polymer having recurring units of the formula:

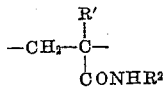

wherein R' is a substituent of the group consisting of hydrogen and methyl radicals, $R^2$ is a substituent of the group consisting of hydrogen and methylol radicals and at least 25 percent of the $R^2$ groups are methylol radicals, and gelling the polymer to a water-impermeable non-peptizable gel by concentrating the solution in situ in the pores to a solids content of at least about 25 percent by weight in order to seal the masonry against substantial penetration by moisture.

2. A process according to claim 1 in which the masonry structure is impregnated with at least 0.005 pound of the polymer of a dry basis per square foot of the surface of the masonry.

3. A process which comprises impregnating the pores of rigid porous masonry with an aqueous solution with a viscosity below about 100,000 centipoises at 20 degrees centigrade of a polymer having recurring units of the formula:

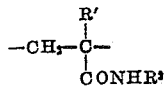

wherein R' is a substituent of the group consisting of hydrogen and methyl radicals and $R^2$ is a substituent of the group consisting of hydrogen and methylol radicals and gelling the polymer in situ while at least 5 percent of the $R^2$ groups are methylol radicals to form a water-impermeable nonpeptizable gel in the pores in order to seal the masonry against substantial penetration by moisture.

4. A process according to claim 3 in which the polymer is gelled in situ by contact with formaldehyde.

5. A process according to claim 3 in which the impregnant contains between about 1 and about 20 percent by weight of the polymer and the polymer is gelled by concentrating the solution in situ to a solids content of at least about 25 percent by weight.

References Cited in the file of this patent

UNITED STATES PATENTS

| 1,160,363 | Baekeland | Nov. 16, 1915 |
| 1,967,275 | Williams | July 24, 1934 |
| 2,146,209 | Graves | Feb. 7, 1939 |
| 2,173,005 | Strain | Sept. 12, 1939 |
| 2,508,717 | Jones | May 23, 1950 |

FOREIGN PATENTS

| 482,897 | Great Britain | Apr. 7, 1938 |